United States Patent [19]

Fisher et al.

[11] 4,103,933

[45] Aug. 1, 1978

[54] FLOOR ANCHOR FOR SEAT BELT

[75] Inventors: Robert C. Fisher, 4210 N. Dixie, West Palm Beach, Fla. 33407; Cecil A. Collins, Pontiac, Mich.

[73] Assignee: Robert C. Fisher, West Palm Beach, Fla.

[21] Appl. No.: 802,025

[22] Filed: May 31, 1977

Related U.S. Application Data

[63] Continuation of Ser. No. 648,399, Jan. 12, 1976, abandoned.

[51] Int. Cl.² .............................................. B60R 21/10
[52] U.S. Cl. ..................................................... 280/744
[58] Field of Search ................ 280/744, 747; 296/385, 296/389

[56] References Cited

U.S. PATENT DOCUMENTS

| 3,437,349 | 4/1969 | Feles et al. | 280/744 |
| 3,659,801 | 5/1972 | Romanzi, Jr. | 280/744 |
| 3,876,249 | 4/1975 | Nilsson | 297/389 |

*Primary Examiner*—Robert R. Song
*Attorney, Agent, or Firm*—Harness, Dickey & Pierce

[57] ABSTRACT

An anchor plate is made from a strip of metal of narrow width having a bend in the center, a cylindrical aperture in one end and a D-shaped aperture in the opposite end. The cloth belt has one side folded over the central portion and the other side folded over the folded side portion providing three thicknesses of reduced width which extends through the D-shaped aperture with the end spread out and stitched to the adjacent main body portion of the belt. The end extending beyond the cylindrical aperture has offset areas which interlock with a plate on the floor to limit the angular movement of the anchor plate.

1 Claim, 5 Drawing Figures

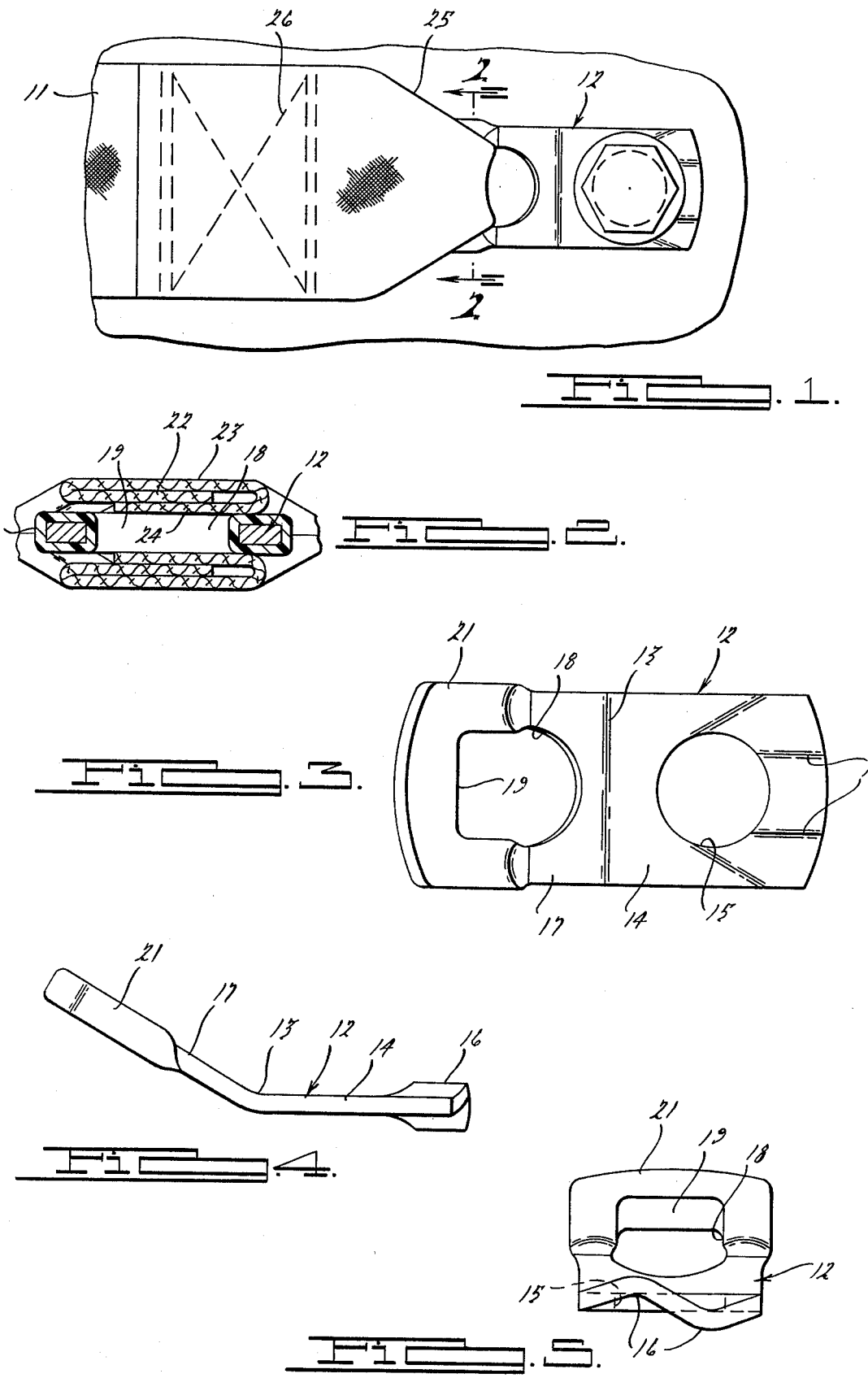

FLOOR ANCHOR FOR SEAT BELT

This is a continuation of application Ser. No. 648,399, filed Jan. 12, 1976, now abandoned.

BACKGROUND OF THE INVENTION

Heretofore, a similar anchor plate was employed for anchoring one end of the belt to the floor. In this arrangement, a wider plate was used having an elongated aperture near the end for receiving and supporting the belt end. Both side edges of the belt were folded over the central portion to be in aligned relation thereon to form a supporting section which was two layers in thickness. The end portion of the anchor plate beyond the cylindrical hole was distorted to prevent it from pivoting any great amount. The central portion was bent to have the end supporting the belt extend at an angle from the anchored end. The end of the belt was flattened and stitched to the main belt body adjacent to the anchor plate to secure the belt thereto.

SUMMARY OF THE INVENTION

The end of a seat belt is secured to a metal anchor plate of narrower width than the plate employed at the present time. The belt end portion extends through a D-shaped rear one end of the plate where it is folded in three layers to reduce strain on the folded portions of the belt when loaded to provide a cushion at the edges of the aperture which prevents undue strain and cutting of the belt material to provide maximum strength. The wider strap now employed has the fold of the belt of double thickness of material when secured in the elongated slot. Beyond having the slot of D-shape, the anchor plate follows the form of the present plate being bent in the center to have the D-portion extend substantially 30° from the anchor portion which has a cylindrical aperture therein with the portions extending therefrom sinuously deflected so as to mate with a plate on the floor to limit the angular movement of the anchor plate. Preferably, the end having the D-slot is dipped or otherwise provided with a coating of plastic which further prevents the cutting or the tearing of the threads of the belt which would produce the weakening thereof. One side edge of the belt is folded over the central portion and the other side is folded over the first side and extended through the D-aperture and folded over the straight bottom edge thereof with the end unfolded and stitched or otherwise secured to the adjacent main portion of the belt. The three layers of the belt provides a cushioning when a load is suddenly applied thereto and permits portions of the folds to shift so as to distribute the load evenly throughout the belt material to prevent the tearing thereof.

BRIEF DESCRIPTION OF THE DRAWING

FIG. 1 is a plan view of a safety belt which extends through a D-aperture in an anchor plate which embodies features of the present invention;

FIG. 2 is a sectional view of the structure illustrated in FIG. 1, taken on the line 2—2 thereof;

FIG. 3 is a plan view of the plate illustrated in the assembled view of FIG. 1;

FIG. 4 is a side view of the structure illustrated in FIG. 3, and

FIG. 5 is a righthand end view of the structure illustrated in FIG. 3.

DESCRIPTION OF THE PREFERRED EMBODIMENT

In the drawing, a belt 11 for a safety belt assembly to be employed in a vehicle is secured to an anchor plate 12 which is substantially narrower in width than the anchor plates now employed. The plate is bent at the central portion along the line 13 and the end 14 is provided with a cylindrical aperture 15 with the outer portion of the plate struck along the lines 16 to provide a sinuously shaped end portion, as illustrated in FIG. 5. This portion mates with a similarly deflected metal plate which is secured to the floor when attached thereto by the bolt extending through the aperture 15 to limit the amount of angular movement that can take place about the bolt. The opposite end 17 of the plate is provided with a D-shaped aperture 18 with the flat edge 19 near the end of the plate. The end 17 of the plate is dipped into or is otherwise provided with a plastic material 21 which covers the sharp edges on the outside of the plate as well as those within the D-shaped aperture. When the plate is anchored to the floor, the end 17 extends from the anchored portion at an angle of approximately 30°.

The end of the belt 11 has one side edge 22 folded over the central portion 23, the extended side edge 24 of which is folded over the folded side edge 22, as illustrated in FIG. 2. The folded end is inserted through the D-shaped aperture 18 in engagement with the plastic coating 21 where it is expanded at 25 and secured by stitching 26 to the main body portion of the belt 11, as clearly illustrated in FIG. 1. Not only is the plate 12 of less width than the plate now being employed but the folding of the belt material to provide the three layers in the portion extending through the aperture 18 provides substantial increase in strength to the connection which cushions the force applied to the belt and permits the distribution of the load when applied to the D-shaped aperture edge to prevent the cutting and tearing of the belt threads. The strength provided to the belt at the reversed end portion cushions the connection with the plate which being substantially less in width reduces the overall cost of the belt assembly.

What is claimed is:

1. An anchor plate for a belt having a pair of apertures located adjacent to the opposite ends of the plate, and a belt having a folded end portion which extends through one of said apertures, securing means extending through said other aperture of the plate, the portion of the plate between said other aperture and the adjacent end being of sinuous form to limit the angular movement of the plate when engaging an element which extends within said sinuous form.

* * * * *